United States Patent
Chan et al.

(10) Patent No.: US 12,462,445 B2
(45) Date of Patent: *Nov. 4, 2025

(54) EXPO FLOOR LAYOUT

(71) Applicant: Zoom Video Communications, Inc., San Jose, CA (US)

(72) Inventors: Andy Chan, Santa Clara, CA (US); Jeffrey Houng, Redmond, WA (US); Yuk Fai Lam, San Jose, CA (US); Pankaj Prasad, San Francisco, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/773,132

(22) Filed: Jul. 15, 2024

(65) Prior Publication Data

US 2025/0014234 A1    Jan. 9, 2025

Related U.S. Application Data

(63) Continuation of application No. 17/582,955, filed on Jan. 24, 2022, now Pat. No. 12,039,627.

(51) Int. Cl.
*G06T 11/00* (2006.01)
*H04L 65/403* (2022.01)

(52) U.S. Cl.
CPC ............ *G06T 11/00* (2013.01); *H04L 65/403* (2013.01); *G06T 2200/24* (2013.01)

(58) Field of Classification Search
CPC .... G06T 11/00; G06T 2200/24; H04L 65/403
See application file for complete search history.

(56) References Cited

U.S. PATENT DOCUMENTS 8,700,696 B2    4/2014  Franke
9,853,922 B2   12/2017  Brody et al.
(Continued)

FOREIGN PATENT DOCUMENTS

JP         5368547 B2    12/2013
KR      20230020697 A     2/2023
WO      2013003914 A1     1/2013

OTHER PUBLICATIONS

"Welcome to Cyber Hitec Let's Take the Next Step into the Future, Together Virtual Exhibitor Guide", Available Online at: https://www.hftp.org/hitec/north_America/i/downloads/CYH20_Virtual_Exhibitor_Guide.pdf, Oct. 2020, 69 pages.
U.S. Appl. No. 17/582,932 , "Non-Final Office Action", Apr. 27, 2023, 13 pages.
U.S. Appl. No. 17/582,932 , "Notice of Allowance", Oct. 12, 2023, 5 pages.
(Continued)

*Primary Examiner* — Edward Martello
(74) *Attorney, Agent, or Firm* — Kilpatrick Townsend & Stockton LLP

(57) ABSTRACT

A system comprising for providing a virtual exposition floor where a first video conference and a second video conference may be established. The first video conference may provide a virtual exposition floor and the second video conference may be associated with a virtual expo booth within the virtual exposition floor. A plurality of participants may access at least the virtual exposition floor. The system may provide, information to generate a graphical representation of the virtual exposition floor, a first graphical representation of the virtual expo booth, and a plurality of avatars associated with the plurality of participants to one or more client devices. The system may also provide data associated with the first video conference, data associated with the second video conference, or data associated with the plurality of avatars.

20 Claims, 12 Drawing Sheets

(56) References Cited

U.S. PATENT DOCUMENTS

| | | |
|---|---|---|
| 10,740,124 B1 | 8/2020 | Campbell, III et al. |
| 10,952,006 B1 | 3/2021 | Krol et al. |
| 11,909,778 B2 | 2/2024 | Chan et al. |
| 12,039,627 B2 | 7/2024 | Chan et al. |
| 2002/0087448 A1 | 7/2002 | Wilkinson |
| 2003/0156135 A1 | 8/2003 | Lucarelli |
| 2005/0165624 A1 | 7/2005 | Shelton et al. |
| 2010/0077311 A1 | 3/2010 | Santoro et al. |
| 2012/0166969 A1 | 6/2012 | Gillo et al. |
| 2014/0098180 A1* | 4/2014 | Periyannan ............ H04N 7/152 348/14.09 |
| 2014/0362165 A1 | 12/2014 | Ackerman et al. |
| 2015/0103136 A1 | 4/2015 | Anderson et al. |
| 2018/0025415 A1 | 1/2018 | Engel et al. |
| 2018/0342106 A1 | 11/2018 | Rosado |
| 2022/0321370 A1 | 10/2022 | Skuratowicz et al. |
| 2022/0345503 A1 | 10/2022 | Chauhan et al. |

OTHER PUBLICATIONS

U.S. Appl. No. 17/582,955, "Final Office Action", Sep. 25, 2023, 39 pages.

U.S. Appl. No. 17/582,955, "Non-Final Office Action", Apr. 26, 2023, 35 pages.

U.S. Appl. No. 17/582,955, "Notice of Allowance", Mar. 5, 2024, 8 pages.

PCT/US2023/010670, "International Preliminary Report on Patentability", Aug. 8, 2024, 12 pages.

PCT/US2023/010670, "International Search Report and Written Opinion", May 8, 2023, 15 pages.

PCT/US2023/011023, "International Search Report and the Written Opinion", May 8, 2023, 13 pages.

Sharda, et al., "A Design Science Approach to Virtual World Implementation of Trade Fairs", Pacific Asia Journal of the Association for Information Systems, AIS Electronic Library (AlSeL), vol. 4, No. 2, Jun. 2012, pp. 49-70.

* cited by examiner

EXPO FLOOR LAYOUT

CROSS-REFERENCE TO RELATED APPLICATIONS

This application is a continuation of U.S. patent application Ser. No. 17/582,955, filed Jan. 24, 2022, titled "Expo Floor Layout," the entirety of which is hereby incorporated by reference.

FIELD

The present application generally relates to videoconferences and more particularly for providing a nested video conference structure for participants in a virtual meeting room of a video conference.

DETAILED DESCRIPTION

Figure 1:
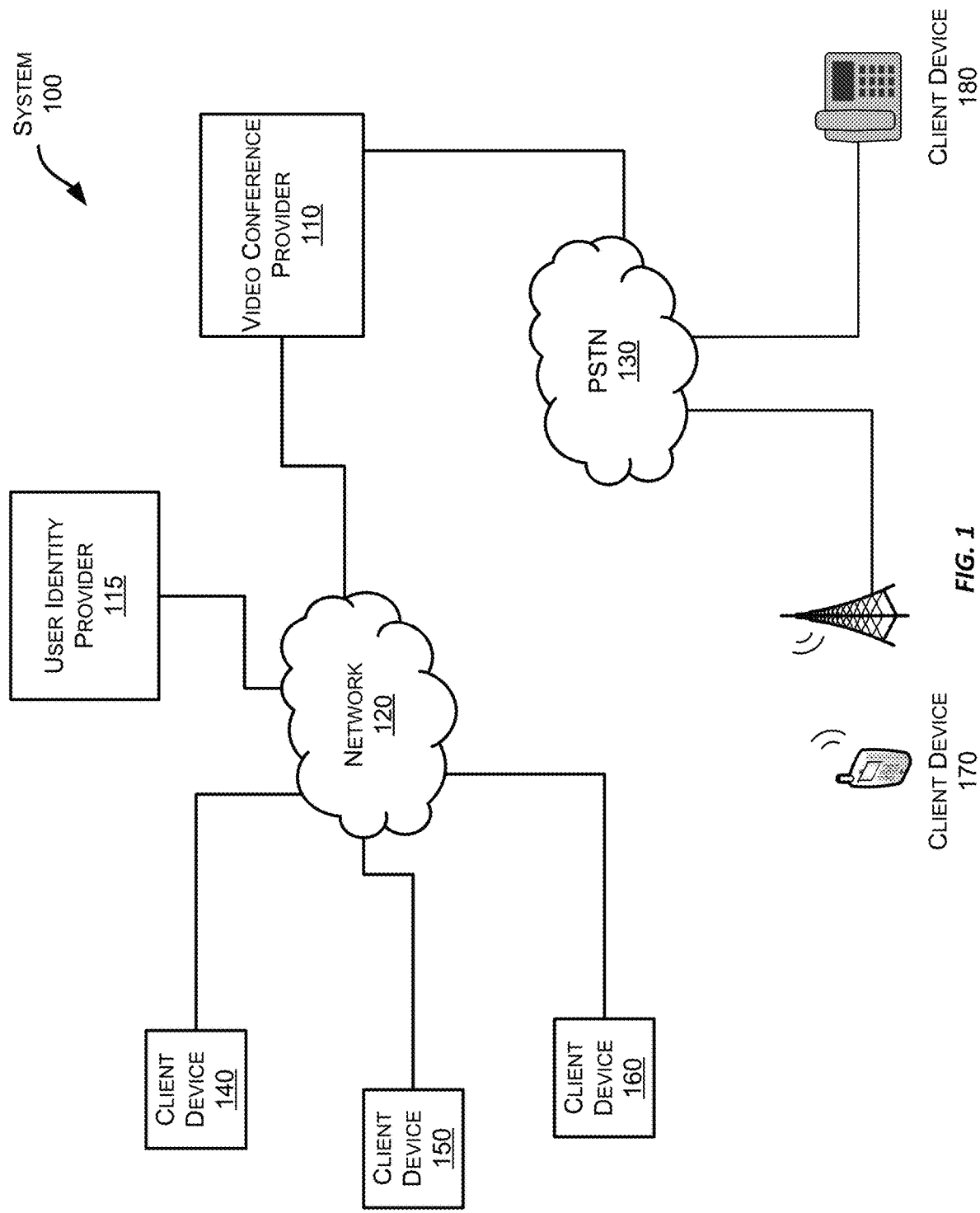
FIG. 1 shows an example system that provides videoconferencing functionality to various client devices.

Examples are described herein in the context of creating video conference expos. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Videoconferencing generally may include one or more participants, communicating with audio and video over a network such as the public internet. Videoconferencing has expanded from a service that once was limited to one or two users to being used to conduct virtual classrooms, business meetings, doctor appointments, etc. However, videoconferences have been limited by the number of hosts or speakers that may be presenting at one time, and hosting multiple, simultaneous video conferences at once may be problematic.

Expositions are events where an organizer invites one or more entities to construct booths on an exposition floor (typically held in convention halls or other large, open buildings). The organizer also invites (or sells tickets to) participants. The entities may then present their ideas and/or products to the participant. As the popularity of events such Comic Con (a comic book convention) and the Consumer Electronics Show (CES) continues to grow, a video conference approach to such expositions may provide a more inclusive and far-reaching way to bring such expos to interested people.

Video conference providers can enable people to interact with each other using their own computers (or "client devices") with both video and audio in a variety of settings, such as in one-on-one conversations, group meetings, and webinars. While each of these types of settings can allow people to interact with each other, they can differ in character. For example, one-on-one conversations include only two people and may involve only a small amount of data being transmitted between the two client devices. Group meetings may involve a larger number of people all interacting with each other, and often only allow for one speaker or presenter to share at a time to the other participants. For example, during webinars, a panelist may present to an audience in a one-way fashion. Current video conferencing structures generally do not allow for multiple speakers to present simultaneously to an audience or allow participants to move between presenters. As such, current video conference structures do not allow for virtual expositions, also known as expositions or "expos".

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
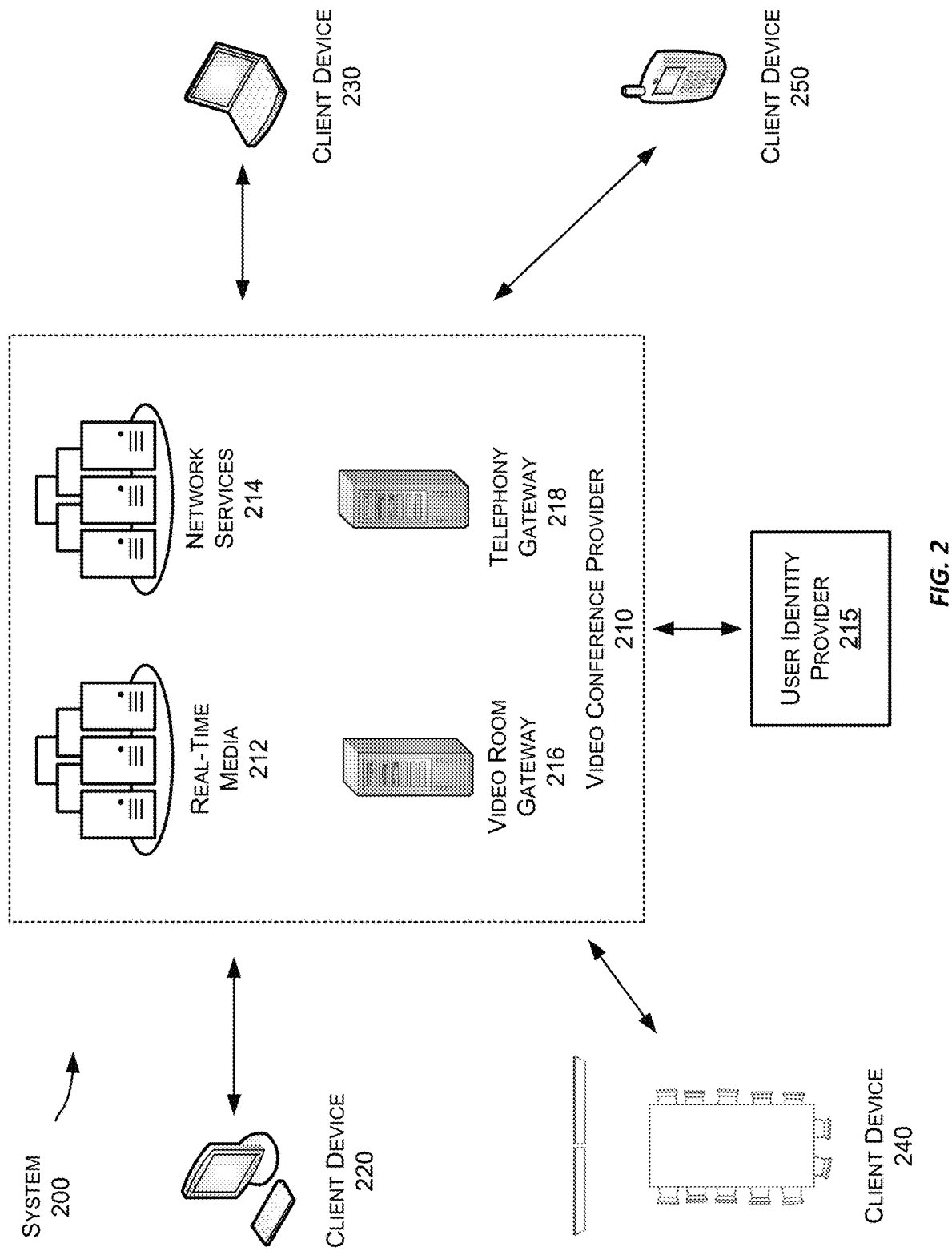
FIG. 2 shows an example system in which a video conference provider that provides videoconferencing functionality to various client devices.

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, etc. FIG. 2, described below, provides a more detailed description of the architecture and functionality of the video conference provider 110.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, a nested video conferencing structure, as described in greater detail with respect to FIGS. 4, 5, and 7, may include more than one "booth." Each "booth" may be a virtual "room" that is associated with a "main" videoconference room or "main meeting". In examples, the "main meeting" may be referred to as an exposition floor ("expo floor"), the details of which will be expanded on below. Thus, participants with permissions in the main videoconference room may exit the expo floor and enter a booth to gather or exchange information pertinent with that booth, before returning to the expo floor.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users. As described in more detail below, depending on the authentication information of a given user, a user may be admitted to the expo floor or one or more booths.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode. As discussed in detail below, in some embodiments, the meeting may terminate for only one room, thereby disconnecting only participants in that room. For example, a booth may terminate and disconnect participants in the booth but the expo floor, along with other booths, may continue allowing participants therein to continue receiving audio and video streams.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. Moreover, while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak or share content in a booth, hear or view certain content shared in the booth, or access other meeting functionality, such as joining certain booths or engaging in text chat with other participants in the booth.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different Examples of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O) as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia streams in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the booth or main meeting, recording meetings, etc. Such functionality may be managed by the network services server(s) 214.

For example, if a host wishes to remove a user from a booth, they may identify the user and issue a command through a user interface on their client device. The command may be sent to a network services server 214, which may then disconnect the identified user from the corresponding real-time media server 212. If the host wishes to move one or more participants into a booth, such a command may also be handled by a network services server 214, which may provide authentication information to the one or more participants for joining the booth and then connect the one or more participants to the booth similarly to how it originally admitted the participants to the expo floor itself.

In addition to creating and administering on-going meetings, the network services server(s) 214 may also be responsible for closing and tearing-down meetings once they have completed. For example, the meeting host may issue a command to end an on-going booth meeting, which is sent to a network services server 214. The network services server 214 may then remove any remaining participants from the booth, communicate with one or more real time media servers 212 to stop streaming audio and video for the booth, and deactivate, e.g., by deleting a corresponding passcode for the booth from the meeting record, or delete the meeting record(s) corresponding to the booth. Thus, if a user later attempts to access the booth, the network services server(s) 214 may deny the request. Similar steps may be taken for ending an expo itself. For example, after receiving a command to end an on-going expo, the network services server 214 communicate with the real time media server(s) 212 to stop streaming audio and video for the expo floor and deactivate a corresponding passcode for the expo floor or delete the meeting record(s) corresponding to the expo floor.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
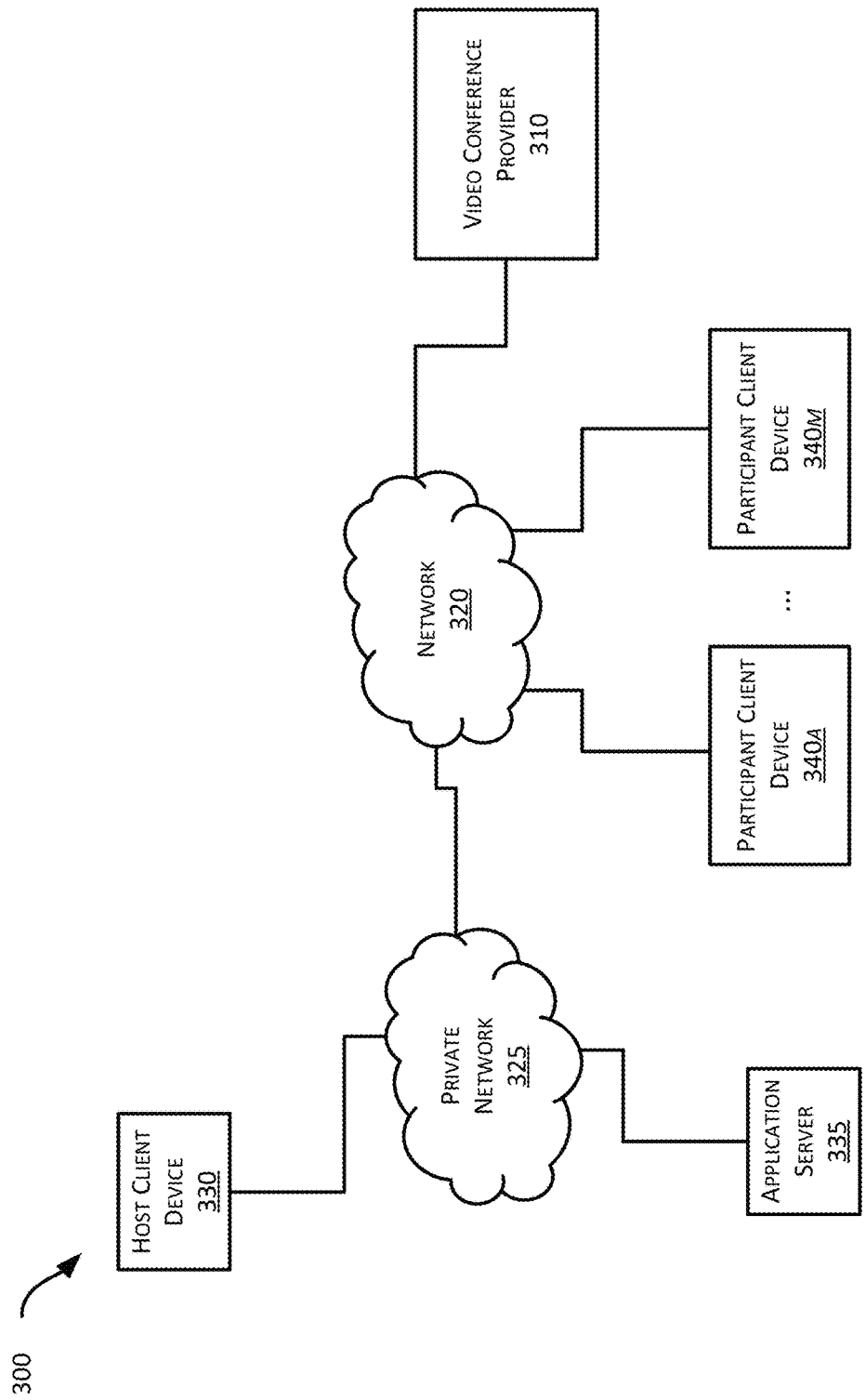
FIG. 3 shows an example system for providing a virtual exposition floor layout.

FIG. 3 shows an example system 300 for providing a virtual exposition floor layout. In this example, a video conference provider 310, such as the video conference provider 110, 210 in FIG. 1 or 2, is connected to a communications network 320, such as the internet. An expo host client device 330 and a number of participant client devices 340a-m (m representing any number of participant client devices in this example) are also connected to the network 320. The system 300 may also include a user identity provider such as the user identity provider 215 in FIG. 2.

A virtual exposition may be a meeting, as is discussed in relation to FIGS. 1 and 2. The expo host client device 330 may connect to the video conference provider 310 and begin a virtual exposition (or "expo") at the video conference provider 310. Similar to creating and beginning a scheduled meeting, generally as described above with respect to FIGS. 1 and 2. However, when scheduling the meeting, the host schedules the meeting as an expo. In this example, the video conference provider 310 creates and manages expos similarly to how it handles conventional meetings as discussed above. However, because virtual expositions generally contain a virtual expo floor as well as one or more booths or virtual "rooms," each having various permission levels, as described below in greater detail.

For example, upon joining an expo, the video conference provider 310 may allow participants to navigate the virtual expo floor and join one or more booths depending on various permission levels. The permission levels may include an expo owner, a sponsor, a speaker, and an expo participant (collectively, "participants"). When participants join a booth including a speaker, as described in greater detail with respect to FIG. 6 participants may be prevented from unmuting their microphone or from streaming video to the booth for other participants to view. In a conventional meeting, participants may be able to interact with other participants and see their respective names, such as in close proximity to other participants' video streams or in a list of participants visible in a graphical user interface ("GUI"). Similarly, in a booth, a participant may be able to observe a conversation going on in the booth, interact with other participants within the booth, and/or gather information about the booth. In other embodiments, the participant may only be able to see information, e.g., names or video feeds, from the host(s) (or "sponsors") of the booth or certain select participants that will be engaged in discussions, such as a speaker in the booth. Still other limits may be imposed on the various participants, such as their ability to react to occurrences during a booth presentation, e.g., participants may be allowed to interact with their GUI to raise their hand to ask a question, but may not be allowed to provide any other feedback.

When the video conference provider 310 begins the expo, it creates a new meeting (including any applicable restrictions, such as those discussed above) and provides video and audio feeds that may be accessed by participants to receive video and audio content during the expo, including audio and video streams exchanged in booths present in the expo. Participants, through their respective participant client devices 340a-m, may join the virtual exposition once it has started and connect to the available video and audio feeds. As noted above, the virtual exposition may include one or more booths to which participants can join.

Figure 4:
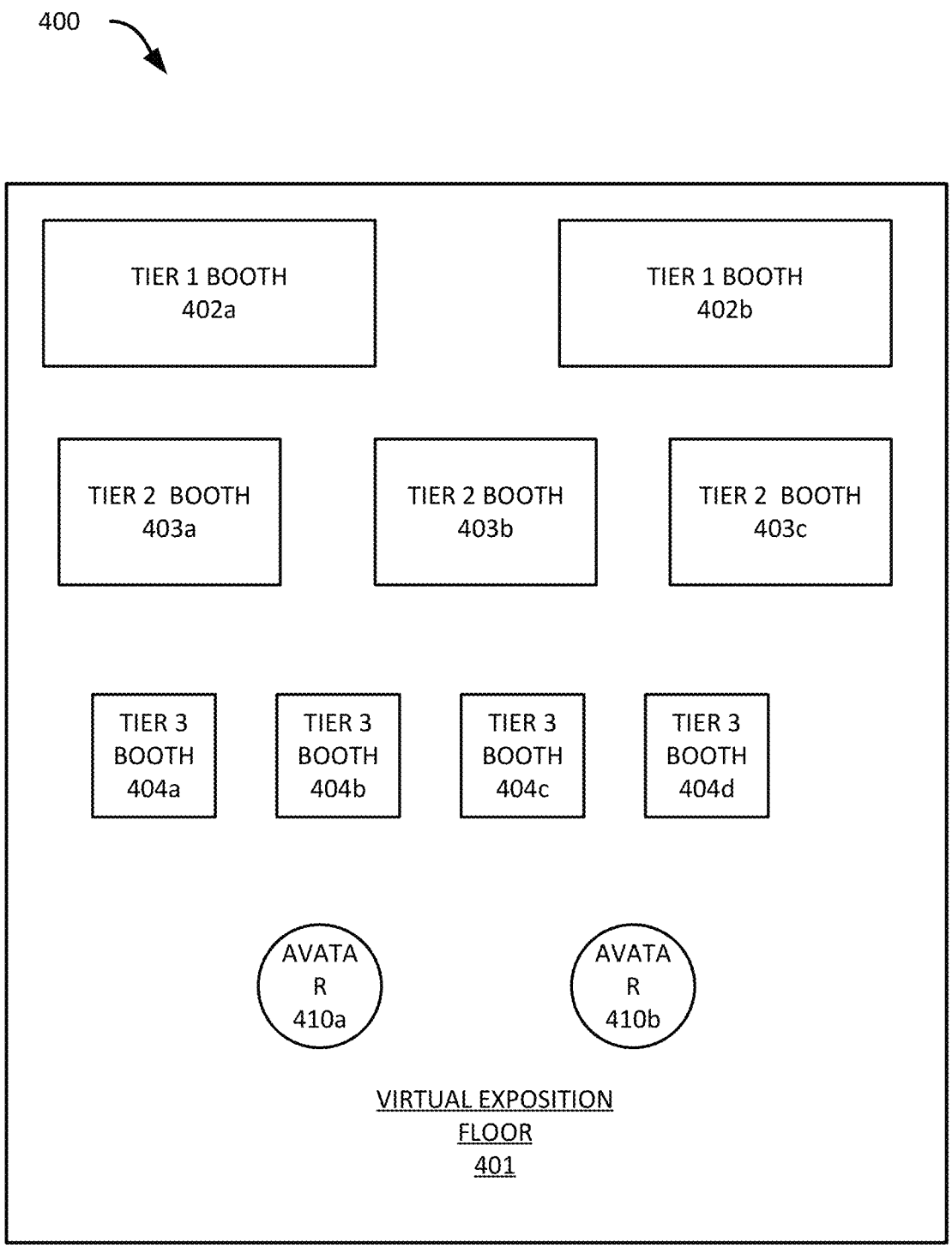
FIG. 4 shows a graphical representation of a virtual exposition.

FIG. 4 illustrates a graphical representation of a virtual exposition, according to certain embodiments. The virtual exposition 400 may be described with relation to the systems described in FIG. 3. The virtual exposition 400 may include an exposition floor 401, one or more tier 1 booth 402a-b, one or more tier 2 booths 403a-c, and one or more tier 3 booths 404a-d (the one or more tiers of booths may be referred to collectively as "booths"). The virtual exposition 400 may also include one or more avatars 410a-b.

The virtual exposition 400 may be a videoconference, hosted by an exposition host. The exposition host may be have permissions granted to them by a video conference provider such as the video conference provider 110 in FIG. 1. The permissions are discussed in further detail in relation to FIG. 6. Each booth may in turn be a videoconference within the virtual exposition, hosted by the respective sponsors (whose permissions are discussed in greater detail in FIG. 6). The exposition owner and/or the respective sponsor may allow participants to join automatically, or sponsors may restrict access to the booth based of predetermined parameters. The predetermined parameters may include a number of participants already in the booth, a permission level of the participant, or other such parameter. In some embodiments, the exposition host may arrange the booths as they appear on the virtual exposition floor 401 by any other scheme, such as grouping the booths by content provided by the respective sponsors.

The exposition host may schedule the virtual exposition 400 to open and close at a specific time, allowing participants into the virtual exposition 400 at specific times. The exposition host may also configure the exposition floor 401 to have a desired layout. The exposition floor 401 shows various booths, created by sponsors, arranged by tier (e.g., tier 1 booths 402a-b at the top). The exposition floor 401 may also include one or more backgrounds. For example, the exposition floor 401 may include a background that represents a physical convention center floor. The exposition floor 401 may include different backgrounds in different regions of the exposition floor 401.

In some embodiments, the backgrounds in different regions may be associated with a subject matter. The booths may then be arranged into the regions by their respective subject matters, correlating to the associated subject matter of each region. In some embodiments, the subject matter of each booth may be entered into a database of other data structure by the exposition host. In other embodiments, the subject matter of each booth may be entered in the database or other structure by the sponsor of that booth. A computing device, configured to read information from the database or other data structure may then cause the booths to be organized by subject matter.

Each booth may be represented by an image or logo. The image or logo, and/or the complexity thereof, may be determined by the tier of the respective booth. Each booths may be assigned a tier based on criteria such as sponsorship level. The tiers of booths may vary by degree of visibility and accessibility by participants. For example, a lower tier booth may be limited to a predetermined number of participants at a given time, or only seen by participants with certain permissions. Furthermore, booths of a given tier may permit the sponsor of the booth, a speaker within the booth, of the expo owner to invite participants to the booth. In some embodiments, an invitation is not needed for a participant to join a booth.

Additionally, other properties of the booths may be determined by their respective tiers. For example, a first booth of one tier may be represented by an image, while a second booth of a second tier may be represented by a video. The tier 3 booths 402a-d may be represented by text against a white background. The tier 2 booths 403a-c may be represented by an image file in a format such as a Joint Photographic Experts Group (JPEG), Portable Networks Graphic (PNG), Tagged Image File Format (TIFF), or other such image file format. The tier 1 booth 402a-b may be represented by a video file format such as the Graphics Interchange Format (GIF), the Moving Picture Experts Group (MPEG) format, or other such video file format. Other representations would be readily apparent to one of ordinary skill in the art.

Each participant of the virtual exposition 400 may be represented by an avatar such as the avatars 410a-b. The avatars 400a-b may be customizable by their respective participant. The avatars 410a-b may be represented by an image file in a format such a JPEG, PNG, TIFF, or other such image file. The avatars 410a-b may also be represented by video files in a format such as a GIF, MPEG, or other video file. In some embodiments, the avatar 410a may have a first permission level, and the avatar 410b may have a second permission level. The first permission level may allow the avatar 410a to utilize more file types (such as those listed above) and display more information than the second permission level.

Figure 5:
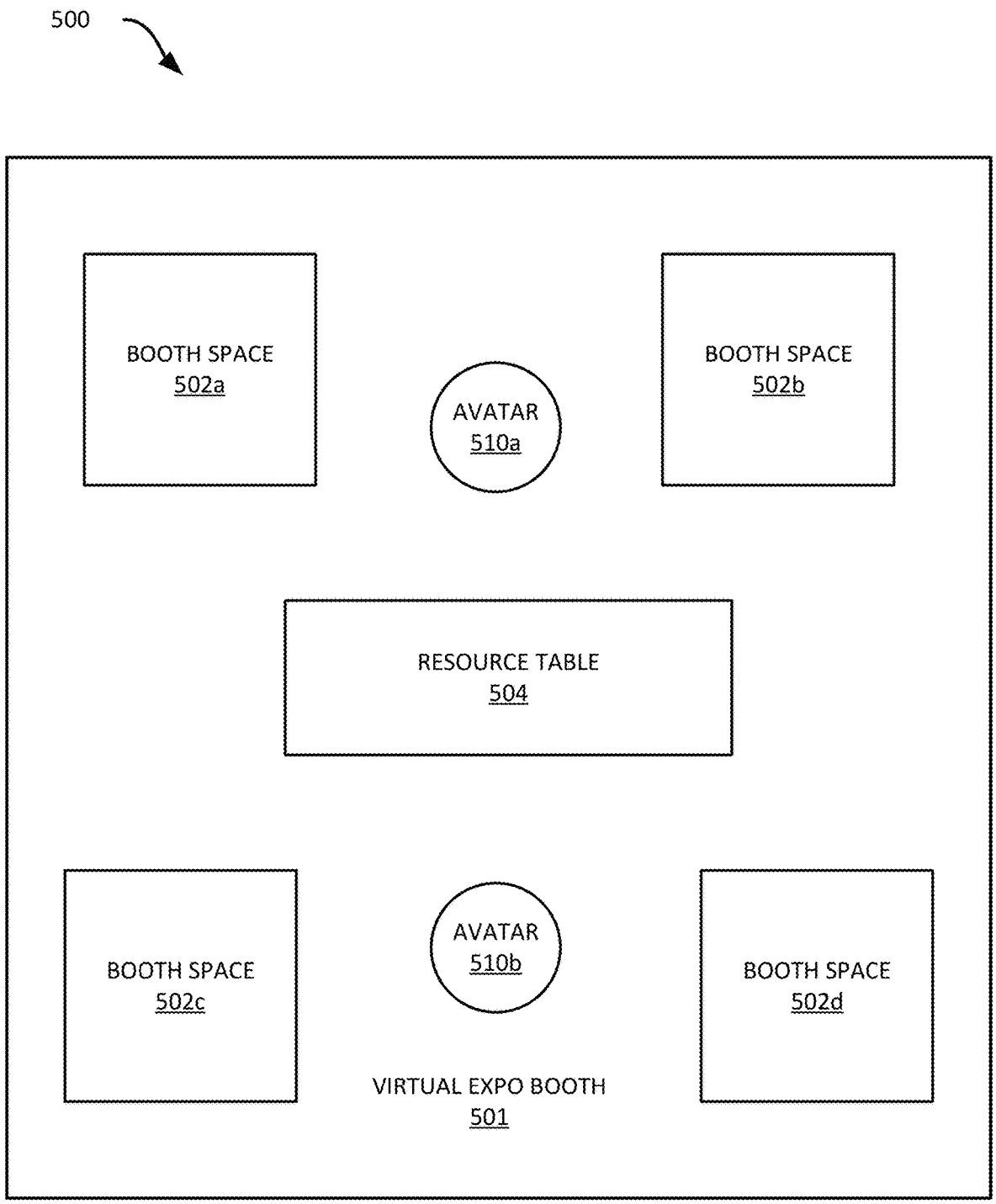
FIG. 5 is an illustration of a graphical representation of a virtual expo booth.

FIG. 5 is an illustration of a graphical representation of a virtual expo booth, according to certain embodiments. The booth 500 may be similar to any of the booths shown in FIG. 4, and therefore may be a graphical representation of a video conference within a virtual exposition floor. For example, the booth 500 may be the tier 1 booth 402a, and have an associated permission level that permits the booth 500 to include one or more booth spaces 502a-d and a resource table 504. The booth 500 may include one or more participants, represented by the avatars 510a-b. The avatars 510a-b may represent the same participants as the avatars 410a-b, where the participants have joined the booth 502a.

The booth spaces 502a-d may be graphical representations of video conferences within the booth 500. In other words, the booth spaces 502a-d may be another video conference with in a virtual exposition. The booth spaces 502a-d may be graphically represented by an image file in a format such as a JPEG, PNG, TIFF, or other image file. The booth spaces 502a-d may be represented by video files in a format such as a GIF, a MPEG, or other video file. The graphical representation may include sound files. The graphical representation of each booth space 502a-d may be determined by the sponsor of the booth.

The graphical representation of each of the booth spaces 502a-d may include information including a subject matter being discussed by a speaker within each of the booth spaces 502a-d. In some embodiments, the sponsor of the booth 500 may set permissions for each of the booth spaces 502a-c. The permissions may include a number or participants allowed in each booth space, whether or not a participant is allowed to join the booth space without an invitation, whether or not the speaker is allowed to invite participants for their associated booth space, and other related permissions. In some embodiments, the speaker may set permissions for their respective booth space.

The resource table 504 may be graphically represented by an image file in a format such as a JPEG, PNG, TIFF, or other image file. The resource table 504 may also be represented by video files in a format such as a GIF, a MPEG, or other video file. In some embodiments, the resource table 504 may include links to one or more files associated with a subject matter being discussed in one or more of the booth spaces 502a-d. The links may cause a file such as a PDF filed to be downloaded from a first computing device to a second computing device. In some embodiments, the second computing device may be associated with a participant of within the booth 500.

Figure 6:
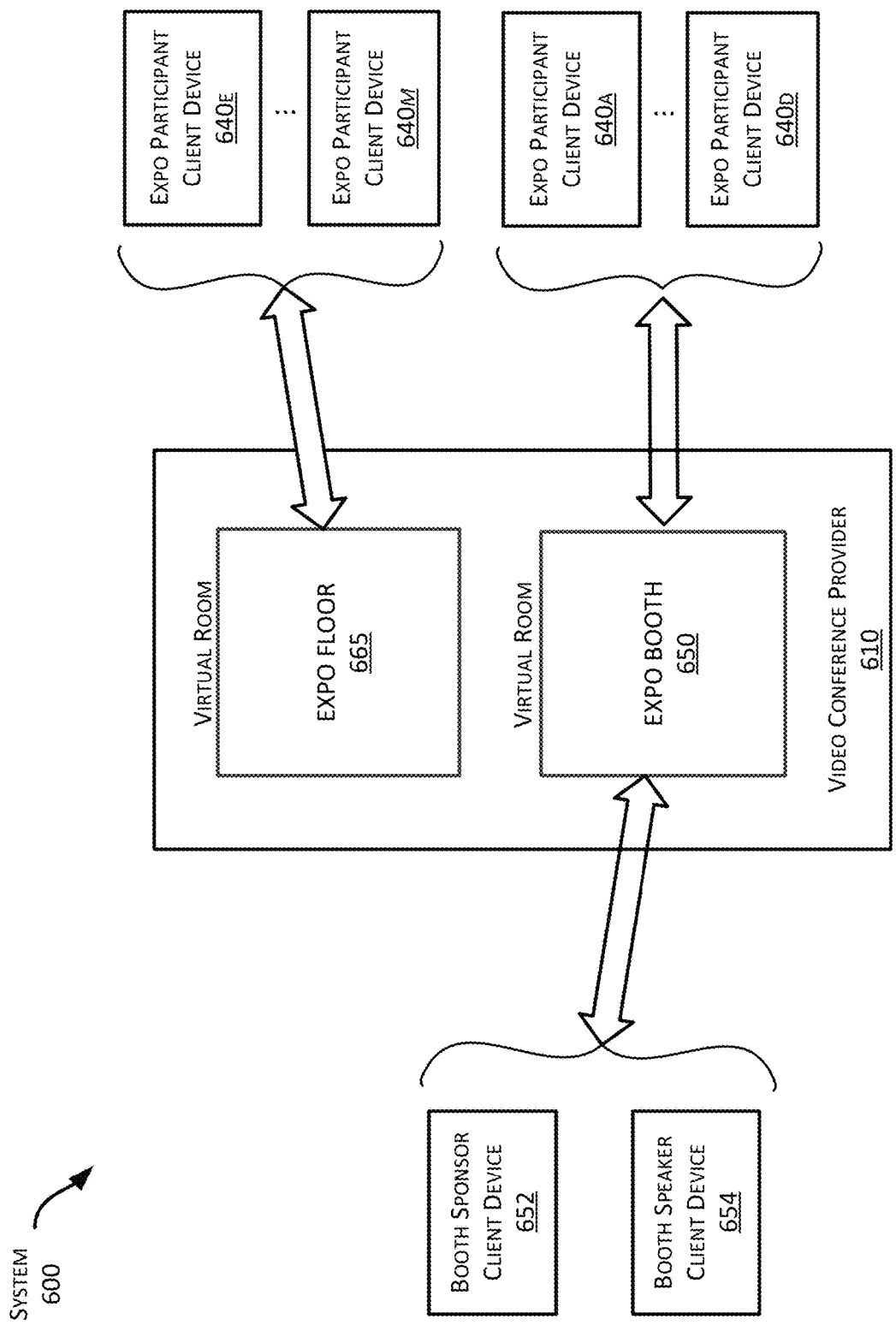
FIG. 6 illustrates a system for providing a booth during a virtual exposition.

FIG. 6 illustrates a system 600 for providing a booth 650 during a virtual exposition. The virtual exposition may include a first video conference, such as an exposition floor ("expo floor") 665. Video conference provider 610 may also establish the booth 650 (or, "virtual booth"), in which a participant can experience the second video conference with one or more other participants.

The virtual exposition floor 665 and the booth 650 may be considered virtual "rooms" in which participants of the expo can meet and communicate. The virtual exposition floor 665 is a virtual "room" in which all participants of the expo can virtually attend and interact with each other or with expo booths positioned on the expo floor. The booth 650 may be a virtual "room" in which participants of the expo assigned to the booth 650 can virtually meet and communicate during the virtual exposition floor 665. As will be described in greater detail with respect to FIG. 6, the virtual exposition floor 665 may include more than one booth 650, and the booth 650 may include a booth space, another virtual room, within the booth 650 itself. During an expo, there may be more than one booth 650. In fact, there may be any number of booths within an expo. The number of booths may depend on the number of participants in the expo or the number of booths that are established and/or registered before or during the expo.

Participants of the expo may have various types of roles. The ability of a participant of an expo to establish a booth, invite other participants to a booth, present streaming audio and/or video within a booth, and other relevant permissions may depend on the role of the participant in the expo. For example, there may be an expo owner (e.g., the participant corresponding to host client device 330 in FIG. 3), one or more sponsor roles (e.g., the participants corresponding to the booth host client device 652), one or more speaker roles (e.g., the participants corresponding to booth speaker client device 654), and one or more participant roles (e.g., participants corresponding to expo participant client devices 640a-640m). Depending on the role of a particular participant in the expo, various restrictions may apply, including the ability of the participant to establish a videoconference such as a booth, invite participants to a booth, and join a booth.

An expo owner may have few to no restrictions. The level of restrictions for an expo owner may be set by the video conference provider 610 or by the expo owner. In cases where there is a co-owner or more than one expo owner, expo owners may have varying levels of restrictions. For example, a main host (e.g., the expo owner who arranged the expo) may be running late and assign another participant the role of co-owner to begin the expo on time. The main host may also assign various restrictions to the co-owner, such as not allowing the co-owner to change the roles of other participants.

The expo owner may be able to establish booths prior to or during an expo and invite participants to one or more booths. An invite may be a suggestion to join a booth, rather than a necessary invite to allow a participant into a booth. The expo owner may also be able to join any booths during an expo. For example, an expo owner may be able to join a VIP booth to evaluate participants and discussions during the VIP booth. The expo owner may also be able to arrange a graphical representation of the virtual exposition floor.

Sponsors of the expo may have more restrictions than the expo owner. The level of restriction of the sponsor role may be set by the expo owner or the video conference provider 610. The sponsor may be able to present content, including audio and video streams, on the virtual exposition floor 665 and may be allowed to host a booth, such as the booth 650.

The sponsor may be able to have one or more speakers within each booth, where the number of speakers permitted in each booth is set by the expo owner. The sponsor, however, may not be able to change the roles of other participants, or invite other participants to a booth. The ability of a sponsor to establish a booth and invite participants to the booth may depend on the settings of the expo. The settings may be determined by the expo owner or the video conference provider 610. In some embodiments, the sponsor may be able to establish a booth and assign participants to that booth, while in other embodiments the participants may freely join the booth.

The speaker role may have permission to present content within a booth, such as the booth 650. In some embodiments, the speaker may only present content within another video conference (or "booth space") within the booth. In other embodiments, all participants may transmit audio and video stream within the booth space. The speaker may be permitted to control the ability of other participants to stream audio and or video content within a booth space (e.g., muting one or more participants within the booth space). In some embodiments, the speaker may have the permission to remove participants from a booth space.

Expo participants may have numerous restrictions, including the ability to establish a booth, invite other expo participants to a booth, join a particular booth, or exchange audio and video streams within a booth or booth space. The level of restrictions placed on an expo participant may depend on the video conference space that the expo participant is part of. For example, in a booth space having a speaker present, an expo participant may not be able to exchange audio and video streams with other participants within the booth space. However, when the expo participant enters the virtual exposition floor 665 or the booth 650, the expo participant may be able to exchange audio and video streams with other participants therein.

During an expo, exchange of the audio and video streams to and from a user's client device may depend on the virtual room that the user is in. For example, as illustrated by FIG. 6, when participants E-M, corresponding to client devices 640e-m, are "on" the virtual exposition floor 665, they can exchange audio and video streams with other participants on the virtual exposition floor 665. When an expo participant enters the expo booth 650, the expo participant may no longer receive audio and video streams exchanged by participants in the virtual exposition floor 665. In other words, the video conference provider 610 may continue to receive the multimedia streams from the expo participant client devices 640e-m but may not transmit the audio and video streams to the expo client devices 640a-d because participants A-D are in the booth 650.

While in the expo booth 650, the participants A-D may exchange audio and video streams with the booth sponsor and/or the booth speaker, as well as with the other participants. For example, the audio and video streams from the expo participant client devices 640a-d may be received by the video conference provider 610 and transmitted to the booth sponsor client devices 652 and the booth speaker client device 654, and vice versa. As noted above, in embodiments where the booth 650 includes a booth space, the participants A-D's ability to exchange audio and video streams with the speaker in the booth space may be limited. For example, the video conference provider 610 may receive audio and video streams from the booth speaker client device 654, and those audio and video streams are transmitted to the expo participant client devices 640a-d, the audio and video streams from the expo participant client devices 640a-d may not be transmitted by the video conference provider 650 to the booth speaker client device 654, unless permission is granted to do so. In this manner, a booth space may provide for a one-way communication meeting, allowing for presentations to an audience within the booth.

Figure 7:
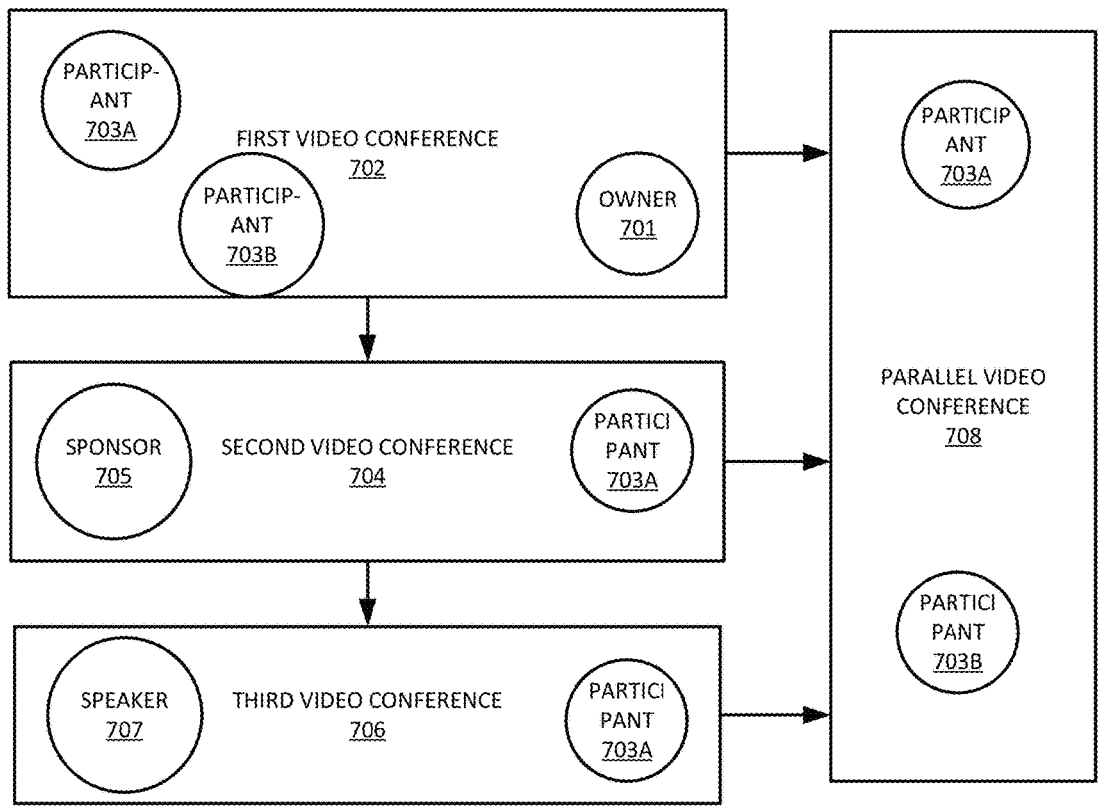
FIG. 7 illustrates a nested video conference structure.

FIG. 7 illustrates a nested video conference structure, according to some embodiments. The nested video conference structure 700 of FIG. 7 will be described with respect to systems shown in FIGS. 1, 3, and 6, however, any suitable system according to this disclosure may be employed, including systems described with respect to FIG. 2. The nested video conference structure 700 may be used by the video conference provider 310 to provide a virtual expo to participants. The nested video conference structure 700 may include a first video conference 702, a second video conference 704, and a third video conference 706. For example, the first video conference 702 may be the virtual exposition floor 665 and the second video conference 704 may be the virtual expo booth 650, and the third video conference 706 may be a booth space within the booth 650, an example of which is described in greater detail with respect to FIG. 10. The nested video conference structure 700 may also include a parallel video conference 708. As described in greater detail below, the parallel video conference 708 may be an ancillary video conference, such as a sidebar conversation between participants. Although only four video conferences are shown in the nested video conference structure 700, any number of video conferences may be present.

The first video conference 702 may be the virtual exposition floor, such as the virtual exposition floor 401 described in FIG. 4. The first video conference 02 may include a plurality of participants including participant 503a and participant 503b. The participants 503a-b may be users of a videoconferencing system such as the system 100.

As noted above, the parallel video conference 708 may be an ancillary video conference, such as a sidebar meeting. As such, the parallel video conference 708 may be created by any of the participants 703a-b, the owner 701, the sponsor 705, and the/or the speaker 707. In FIG. 7, the participants 703a and 703b may be the only participants in the parallel videoconference. The participant 703a may have sent an invitation to the participant 703b to join the parallel video conference 708. Both participants 703a-b may have the permission to send and receive audio and/or video messages within the parallel video conference 708. The parallel video conference 708 may include chat functionality, video functionality, or any other form of one on one or multi-participant communication.

Although only one parallel video conference 708 is shown, there may be any number of parallel video conferences. Any party in within the nested video conference structure 700 may create one or more parallel video conferences by inviting another party. For example, the sponsor 705 may invite the participants 703a-b to a first parallel video conference, while the owner 701 may invite the speaker 707 to a second parallel video conference. A parallel video conference may be created from and between any of the video conferences within the nested video conference structure 700. In examples, a parallel video conference as used herein may include a sidebar meeting, a breakout room, a waiting room, and the like.

The nested video conference structure 700 therefore provides access to various video conferences to members of a primary video conference. For example, a participant of the virtual expo may access the virtual exposition floor (the first video conference 702). From the virtual exposition floor, the participant may access a virtual expo booth (the second video conference 704), such as tier 1 booth 402a in FIG. 4. Then, once joined to the virtual expo booth, the participant may join a booth space within the virtual expo booth (the third video conference 706). At any point, the participant may begin a sidebar meeting (the parallel video conference 408) with any other participant. Thus, from the participant's view, the virtual expo consists of a series of nested video conferences. In some embodiments, the nested video conference structure 700 is designed to function thusly by the video conference provider. In other embodiments, the video conference provider and/or expo owner may provide information to a client device to generate an appearance of the nested video conference structure 700, while the first video conference 702, second video conference 704, and third video conference 706 may be operated as separate meetings, as described in FIG. 3.

Figure 8:
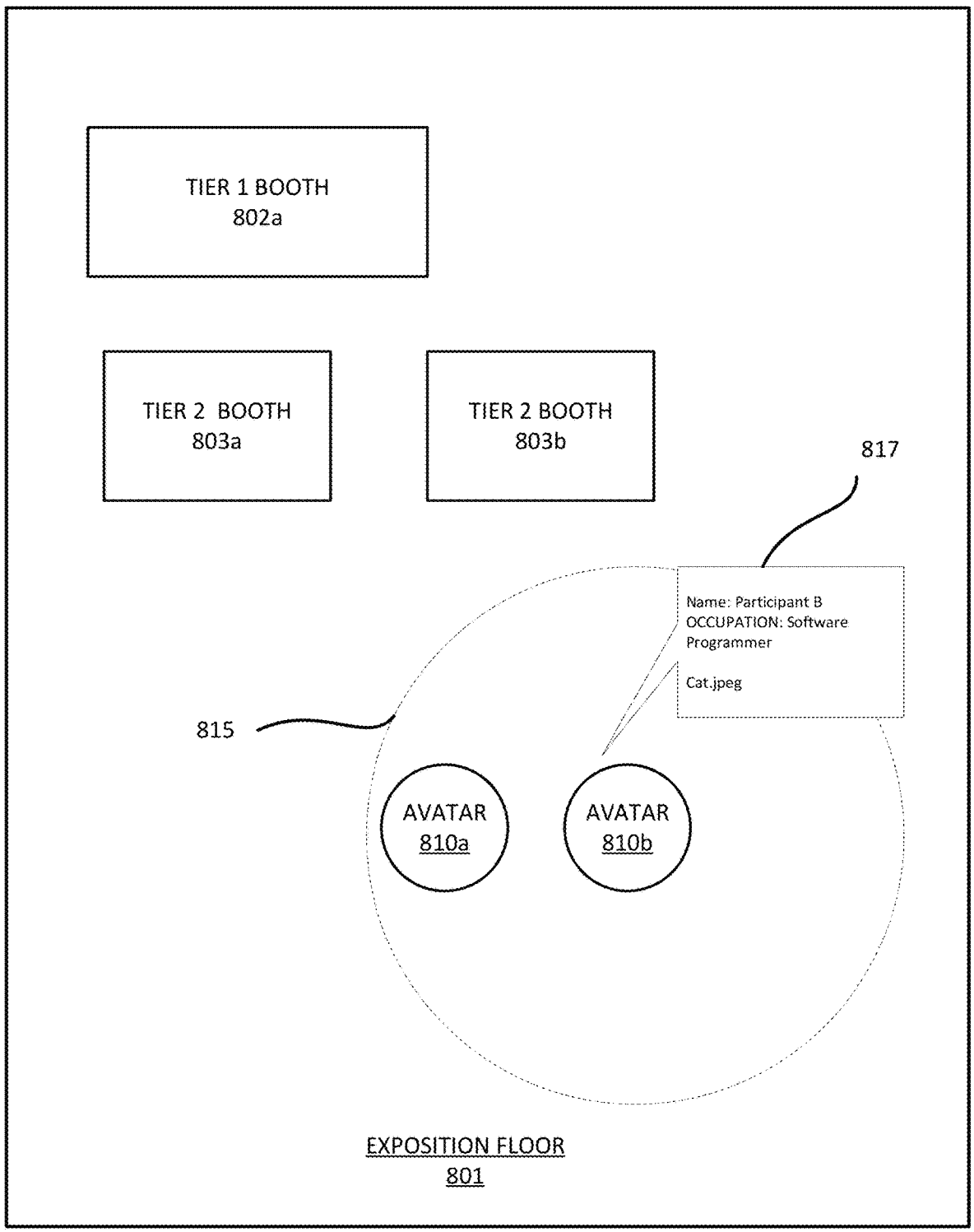
FIG. 8 illustrates a graphical representation of a virtual exposition with an avatar information display window.

FIG. 8 illustrates a graphical representation of a virtual exposition with an avatar information display window, according to some embodiments. The virtual exposition 800 may be similar to the virtual exposition 400. As such, the virtual exposition floor 801 may be similar to the virtual exposition floor 401 and the tier 1 booth 802a, tier 2 booth 803a, tier 2 booth 803b, and avatars 810a-b may be similar to the corresponding representations in FIG. 4.

The avatar 810a may be associated with a first participant of the virtual exposition 800. The first participant may also be associated with a client device, such as expo client device 640e in FIG. 6. An input from client device may cause the avatar 810a to move on the graphical representation of the virtual exposition floor 801 to within a predetermined proximity 815 of the avatar 810b. The client device may determine that the avatar 810a is within the predetermined proximity 815. The client device may then cause an avatar information window 817 to be displayed on the client device.

In some embodiments, the client device may transmit a signal to a video conference provider similar to the video conference provider 310 in FIG. 3. The video conference provider may then determine that the avatar 810a is within the predetermined proximity 815. The video conference provider may then provide information to the client device to generate the avatar information window 817.

The avatar information window 817 may include information such as a name of a second participant associated with the avatar 810b, an occupation of the second participant, and an image file such as a JPEG or GIF. In some embodiments, the information displayed in the avatar information window may be provided to the video conference provider by the second participant before the beginning of the virtual exposition. The video conference provider may then provide the information to the client device prior to the avatar 810a moving within the predetermined proximity 815 or at the time that the avatar information window 817 is generated. In this case, the information displayed in the avatar information window 817 may be stored on the client device until the avatar 810a moves within the predetermined proximity 815.

Although the avatar information window 817 is illustrated displayed above the avatar 810b, other configurations are possible. For example, the avatar information window 817 may be displayed on a sidebar. Additionally, the avatar 810a may be within a predetermined proximity of another avatar as well as the avatar 810b. Avatar information windows associated with both the other avatar and the avatar 810b may then be displayed on a sidebar, appearing outside the virtual exposition floor 801. In other embodiments, the avatar information window may appear anywhere on the virtual exposition floor 801. Furthermore, although the avatar information window 817 is illustrated as displaying a name, an occupation, and image file (all associated with the avatar 810*b*), this is merely an example of information that could be displayed. For example, contact information, a company name, or other personal information may be included. One of ordinary skill in the art would instantly recognize many other configurations.

In some embodiments, the avatar information window 817 may include a preview of a name badge associated with the avatar 810*b*. The name badge may include more detailed information, such as contact information of the participant associated with the avatar 810*b*. The name badge may also include a meeting button that sends an invitation to a client device associated with avatar 810*b* to join a sidebar meeting. The sidebar meeting may be a parallel video conference such as the parallel video conference 708.

Figure 9:
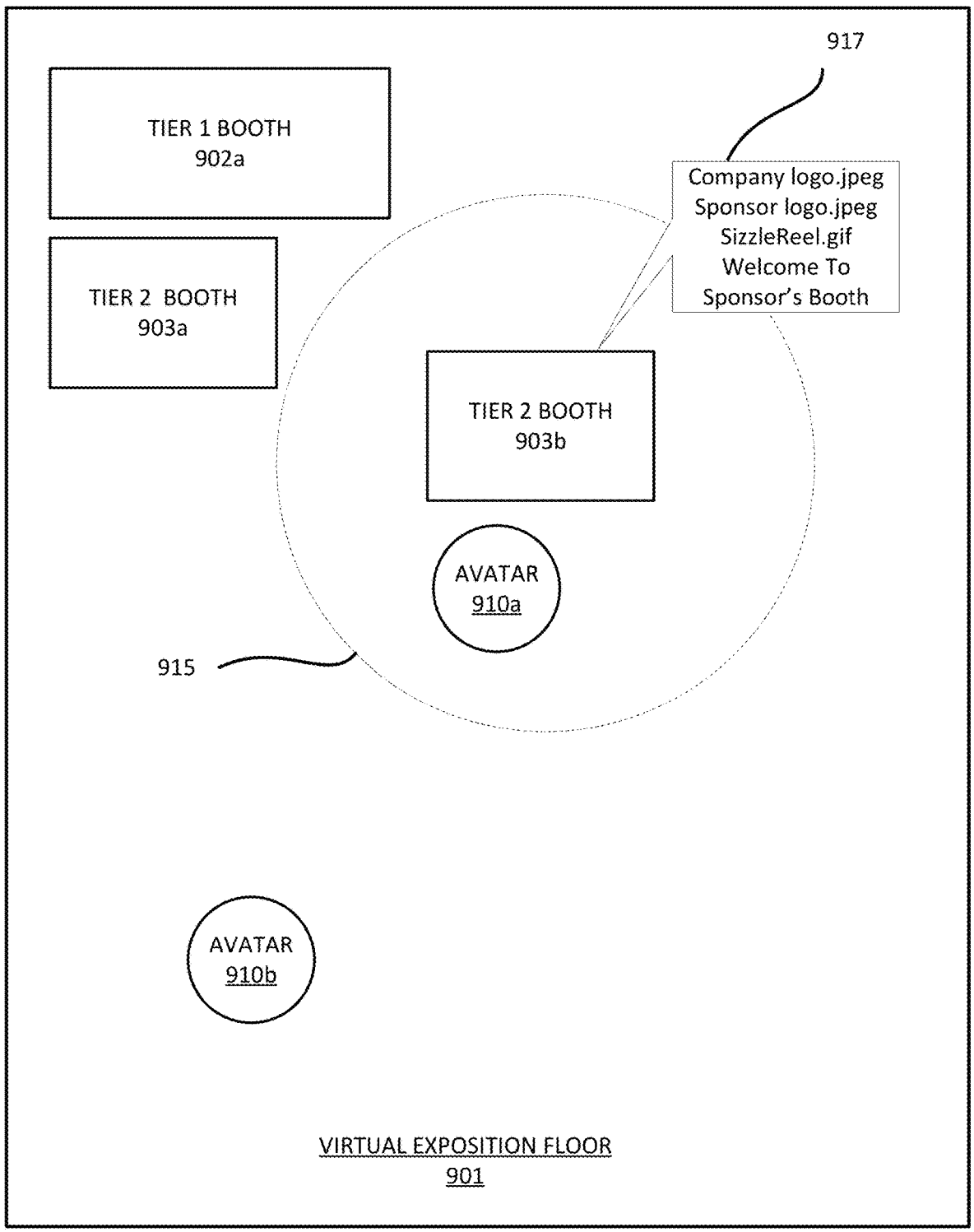
FIG. 9 illustrates a graphical representation of a virtual exposition with an information window.

FIG. 9 illustrates a graphical representation of a virtual exposition with an information window, according to some embodiments. The virtual exposition 900 may be similar to the virtual exposition 400. As such, the virtual exposition floor 901 may be similar to the virtual exposition floor 901 and the tier 1 booth 902*a*, tier 2 booth 903*a*, tier 2 booth 903*b*, and avatar 910*a* may be similar to their corresponding representations in FIG. 4.

The avatar 910*a* may be associated with a first participant of the virtual exposition 900. The first participant may also be associated with a client device, such as expo client device 640*e* in FIG. 6. An input from the client device may cause avatar 910*a* to move on the graphical representation of the virtual exposition floor 901 to within a predetermined proximity 915 of the tier 2 booth 903*b*. The client device may determine that the avatar 910*a* is within the predetermined proximity 915. The client device may then cause an information window 917 to be displayed on the client device.

In some embodiments, the client device may transmit a signal to a video conference provider similar to the video conference provider 310 in FIG. 3. The video conference provider may then determine that the avatar 910*a* is within the predetermined proximity 915. The video conference provider may then provide information to the client device to generate the information window 917.

The information window 917 may include an image file image file in a format such as a (JPEG), (PNG), (TIFF), or other such image file format. The information window 917 may also include video files in a format such as such as a GIF, a MPEG, or other video format. In some embodiments, the information window may include a different graphical representation than that included in the graphical representation of the tier 2 booth 903*b* (as described in relation to FIG. 5). The image or video may show a logo associated with the participant (e.g., a company logo, a self-photograph or other image the associated participant would like to display). The image or video may also show a product or demonstration of a product offered by the sponsor of the tier 2 booth 903*b*.

In some embodiments, the information window 917 may include text associated with one or more booth spaces within the tier 2 booth 903*b*. The text may include a topic, a schedule of speakers, and other information about the booth. The text may be included in addition to other data, such as the preview described above.

The information window 917 may include a preview a third video conference (or booth space) included within the tier 2 booth 903*b*. For example, information window 917 may include a portion a discussion taking place in the booth space. In some embodiments, the portion may be a pre-recorded portion of a discussion similar to that occurring (or to occur in the future) in the booth space. In other embodiments, the portion may include a temporary connection to the booth space. In other words, the information window 917 may automatically connect to the third video conference. The client device may then receive audio and video feeds from the third video conference, but may be unable to transmit audio or video to the third video conference. In some examples, the client device may only join the third video conference upon sending a request to join the tier 2 booth 903*b*.

In some embodiments, the avatar 910*a* may be within a predetermined proximity of another booth as well as the tier 2 booth 903*b*. The client device may then cause one or more prompts, associated with the other booth and/or the tier 2 booth 903*b*, to be displayed. Upon activation of the one or more prompts, an information window corresponding to the associated booth may be displayed by the client device. In other words, the client device may not display both associated information windows simultaneously, but rather allow the client device to select and view a desired information window.

Although the information window 917 is illustrated as being displayed near the tier 2 booth 903*b*, other configurations are possible. For example, the information window may be displayed on a sidebar (not pictured). In the case described above, where the avatar 910*a* is within a predetermined distance of one or more booths, the corresponding information windows may be displayed in the sidebar simultaneously.

Figure 10:
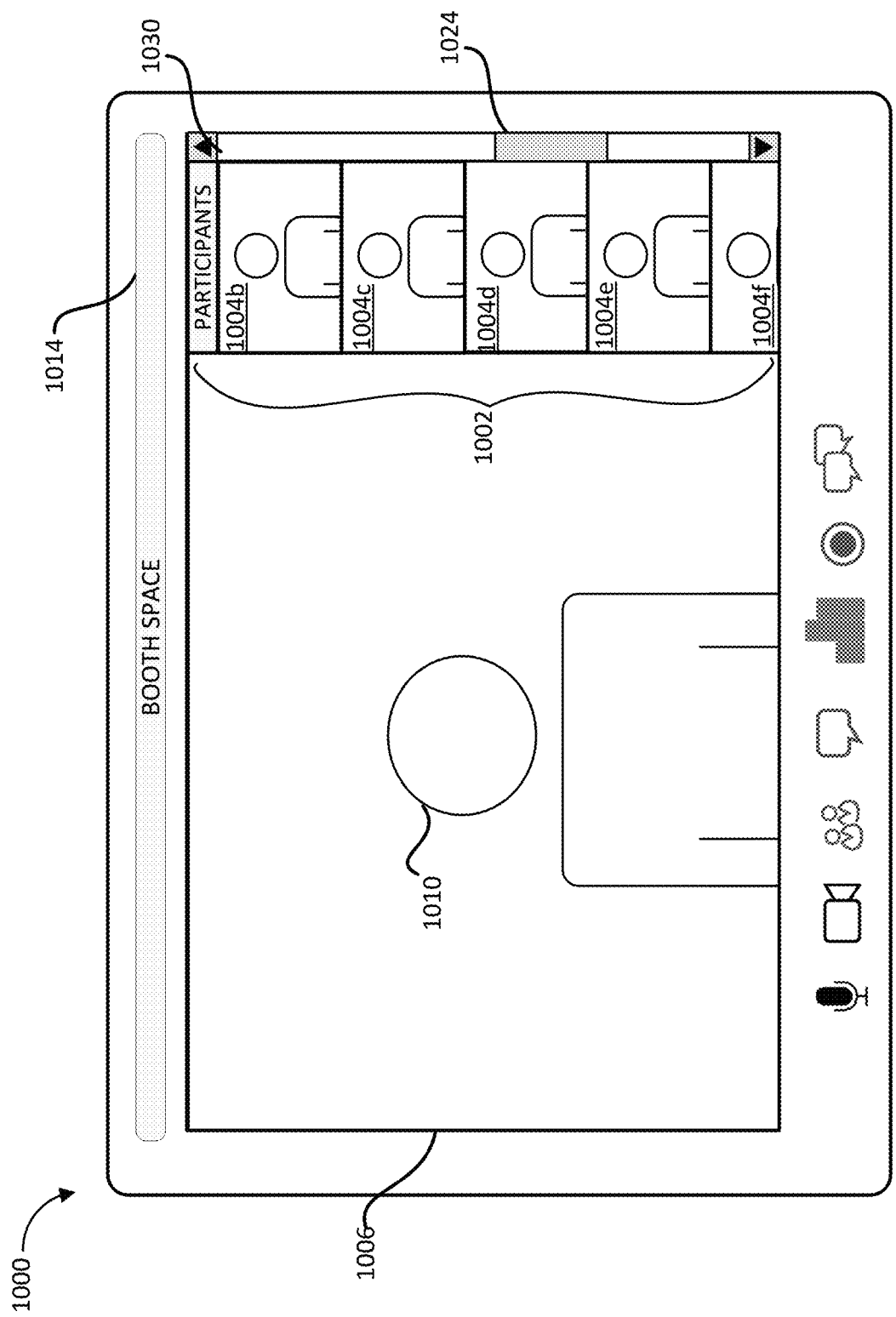
FIG. 10 illustrates a graphical representation of a booth space.

FIG. 10 illustrates a graphical representation of a booth space, according to certain embodiments. The graphical representation 1000 may be provided for a booth space, such as booth space 602*a* in FIG. 6. The graphical representation 1000 may be presented to one or more expo participants during an expo, such as the virtual expo 365. For example, after joining the virtual exposition floor 665, an expo participant may join an expo booth, such as booth 650 in FIG. 6. The expo participant may then join a booth space, such as booth space 502*a* in FIG. 5.

In some embodiments, the graphical representation 1000 is viewable to a participant of the booth space on the participant's device, such as the expo participant client device 640*a* in FIG. 6 (hereinafter "client device"). Presentation of the graphical representation 1000 on the client device may be in response to joining the booth space.

To indicate to a participant, such as expo participant 1004*a* (not shown but viewing the graphical representation 1000), that he or she is in the booth space, an indication 1014 may be provided. The indication 1014 may be helpful for the expo participant 1004*a* to know that his or her audio and video streams are no longer being transmitted to participants in the booth space, and in the event the participant has permissions to share content within the booth space, to indicate that the audio and video streams may be shared within booth space.

The display 1006 may display the video stream of a speaker 1010 from the graphical representation 1000. The speaker 1010 may be similar to the speaker 407, described in FIG. 4. The audio stream from the speaker 1010 may also be transmitted along with the display 1006. In some embodiments, more than one speakers may be speaking, and in such cases, display 1006 may include two or more windows providing the video streams from the speakers.

The graphical representation 1000 may include a participant list 1002. The participant list 1002, may include a plurality of expo participants 1004*a-f* within the booth space. The participant list 1002 may include all the expo participants that have joined the booth space. The participant list 1002 may include a video stream, a picture an image, a representation, or an avatar (e.g., avatar 510*a* from FIG. 5) of each of the expo participants in the booth space, depending on associated privacy settings or permissions. As booth spaces may be attended by a large number of people, the participant list 1002 may include a scroll 1024 that can allow a user to scroll through the participant list 1002 to see other expo participants.

Although FIG. 10 illustrates a booth space where the speaker 1010 is presenting and the expo participants 1004*a-f* are receiving audio and video feed associated with the speaker 1010, other configurations are possible. For example, the booth space may be a more "free-form" discussion. In this example, the speaker 1010, such a sponsor representative, may be associated with the booth space, and the expo participants 1004*a-f* may join or leave the booth space at any time. Any of the expo participants 1004*a-f* may ask a question or present audio or video content, and therefore be pictured in the display 1006 in place of the speaker 1010.

Figure 11:
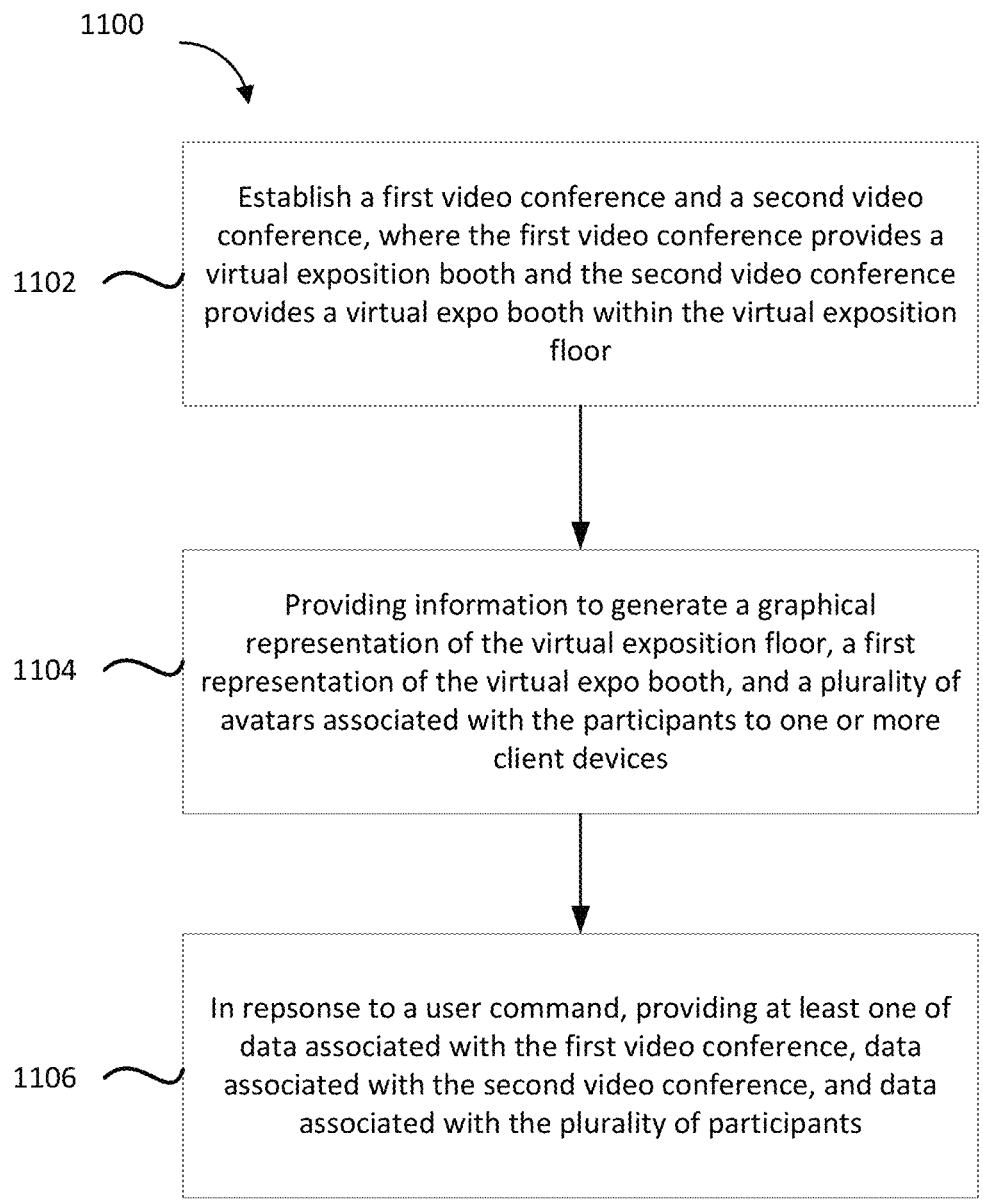
FIG. 11 illustrates a flowchart of a method of generating a graphical representation of a virtual exposition.

FIG. 11 illustrates a flowchart of a method of generating a graphical representation of a virtual exposition, according to embodiments. At 1102, a video conference provider may establish a first video conference where the first video conference may be a virtual exposition floor. The video conference provider may also establish a second video conference, where the second video conference is associated with a virtual expo booth within the virtual exposition floor. There may be multiple second video conferences, each associated with a virtual expo booth within the virtual exposition floor. Multiple participants may access the virtual exposition floor and/or the virtual expo booth.

The video conference provider may establish a separate video conference for first video conference and each of the virtual expo booths. The video conference provider may also provide functionality through the systems described in FIGS. 1-3 to enable participants to move from one video conference to another. The video conference provider may allow participants to join any virtual expo booth within the virtual expo at any time during an operating time of the virtual exposition. In some embodiments, the video conference provider may only allow access to a given virtual expo booth within a predetermined time frame. The predetermined time may be set by the video conference provider, the expo owner, or the sponsor associated with the booth.

In some embodiments, the virtual exposition floor may be hosted by an expo owner. The expo owner may be the video conference provider, or the expo owner may be given permissions by the video conference provider to establish one or more video conferences using the video conference provider's system(s). The video conference provider may set the permissions for the expo owner or the expo owner may set the permissions themselves, as is described in FIG. 6. The expo owner may thereby control properties associated with the virtual exposition floor such as setting permissions for each of the plurality of participants, controlling the graphical representation of the first video conference, establishing a start and end time of the first and second video conferences, and other properties associated with the virtual exposition floor.

At 1104, the video conference provider may provide, to one or more client devices, information to generate a graphical representation of the first video conference (or "virtual exposition floor"). The video conference provider may also include information to generate a graphical representation of the second video conference (or "virtual expo booth"). The video conference provider may also provide information to generate a plurality of avatars, where the plurality of avatars are associated with a respective participant from the plurality of participants.

In some embodiments, the graphical representation of the first video conference may include a first background. The first background may include one or more image files in formats such as JPEG, PNG, TIFF, or other such image file format. The first background may also include a video file format such as the Graphics Interchange Format (GIF), the Moving Picture Experts Group (MPEG) format, or other such video file format.

The graphical representation of the virtual exposition floor may include a first layout of the virtual exposition floor, including locations of and information about one or more virtual expo booths. For example, as illustrated in FIG. 5, the virtual exposition floor 501 may represent the first layout of the virtual exposition 500. In some embodiments, a client device associated with the expo owner may transmit information associated with a second layout to the video conference provider. The video conference provider may then transmit the information to one or more client devices, where a revised layout of the virtual exposition floor may be generated. In reference to FIG. 5, the new graphical representation may differ in having one or more of the tier 1, tier 2, and/or tier 3 booths represented in a different location than is shown on the virtual exposition floor 501. Furthermore, the new graphical representation may include a second background.

The plurality of avatars may be avatars such as the avatars 510*a-b* in FIG. 5. The plurality of avatars may be customizable by an associated participant. The plurality of avatars may be include an image file in a format such a JPEG, PNG, TIFF, or other such image file. The avatars 510*a-b* may also include video files in a format such as a GIF, MPEG, or other video file. In some embodiments, the file types or other information permitted to be associated with an avatar may be determined by a permission level. The permission level may be determined by the expo owner and/or the video conference provider.

In some embodiments, the video conference provider and/or expo owner may receive a request from a client device to join the virtual expo booth. In response to the request, the video conference provider may provide information to generate a second graphical representation of the virtual expo booth. The virtual expo booth may include a graphical representation of a third video conference. The third video conference may be associated with a booth space within the virtual expo booth.

In some embodiments, the second graphical representation of the virtual expo booth may include a link, e.g., represented by a resource table 604, that when activated by the client device, causes one or more files associated with the virtual expo booth and/or the booth space to be sent to the client device. The files may include formats such as Portable Document Format (PDFs), DOC (and related, such as DOCX), JPEG, or any other electronic file format. For example, a participant associated with the client device may select the virtual expo booth space and, in response, to the selection, may receive a schedule of presentations provided at the virtual expo booth space in a PDF format.

In some embodiments, the video conference provider may receive a request from a client device to join the booth space. In response to the request, the video conference provider may transmit information to the client device to generate a graphical representation of the booth space. The graphical representation of the booth space may be similar to the virtual representation 900 in FIG. 9.

At 1106, in response to a user command from a first client device, the video conference provider may provide various data to at least one client device. The various data may include data associated with the first video conference (virtual exposition floor), data associated with the second video conference (virtual expo booth), and data associated with the plurality of avatars associated with a respective participant. The data associated with the virtual exposition floor may include the first layout and the first background, as described above. The data associated with the virtual exposition floor may also include audio and/or video feeds.

The data associated with the virtual expo booth may include an image file in a format such a JPEG, PNG, TIFF, or other such image file. The data associated with the virtual expo booth may also include video files in a format such as a GIF, MPEG, or other video file. In some embodiments, the file types or other information permitted to be associated with the virtual expo booth may be determined by a permission level. The permission level may be determined by the expo owner and/or the video conference provider.

The data associated with the plurality of avatars associated with a respective participant may include an image file in a format such a JPEG, PNG, TIFF, or other such image file. The avatars may also include video files in a format such as a GIF, MPEG, or other video file. In some embodiments, the file types or other information permitted to be associated with an avatar may be determined by a permission level. The permission level may be determined by the expo owner and/or the video conference provider. The data associated with the plurality of avatars may also include a name associated with the respective participant, an occupation associated with the respective participant, an image file, and other personal information.

In some embodiments, only the data associated with a requested video conference may be provided to the client device. For example, a client device may request access to join the virtual exposition floor. Data may then be provided to the client device only as is associated with the virtual exposition floor and subsequently stored on the client device. The client device may then request permission to join a virtual exposition booth, causing data associated with the virtual exposition booth to be transmitted to the client device and stored. A similar process may occur for data associated with a booth space and/or avatar.

In other embodiments, the data associated with the virtual exposition floor, the data associated with the virtual expo booth, and the data associated with the plurality of avatars may be stored on a client device without being used to generate an image until a request is made. In relation to FIG. 4, for example, the video conference provider may send data associated with the avatar 410*b* to a client device associated with the avatar 410*a*. The client device may store that information until a user request is made for the data associated with the avatar 410*b*. The client device may determine that the avatar 410*a* moved to within the predetermined proximity 415 of the avatar 410*b* and cause the data associated with the avatar 410*b* to be displayed. The data associated with the second avatar 410*b*, may include a name associated with the second avatar 410*b*, an occupation associated with the second avatar 410*b*, or an image associated with the second avatar 410*b*. In some embodiments, the video conference provider may determine that the avatar 410*a* is within the predetermined proximity 415 and send information to the client device to generate a display of the data associated with the avatar 410*b*. Similarly, the client device may store the data associated with the virtual expo booth, and only generate a display of the data when an associated avatar is within a predetermined proximity of the virtual expo booth (as described in FIG. 9).

In some embodiments, one or more client devices may send a request to the video conference provider to join a virtual expo booth. The video conference provider may, in response to the request, provide information to the client devices to generate a second graphical representation of the virtual expo booth. The second graphical representation of the virtual expo booth may include a graphical representation of a booth space within the virtual expo booth. In response to a second request, the video conference provider may transmit information to the client devices to generate a graphical representation of the booth space. The second graphical representation of the virtual expo booth may be similar to the virtual expo booth 600, and include similar components.

Figure 12:
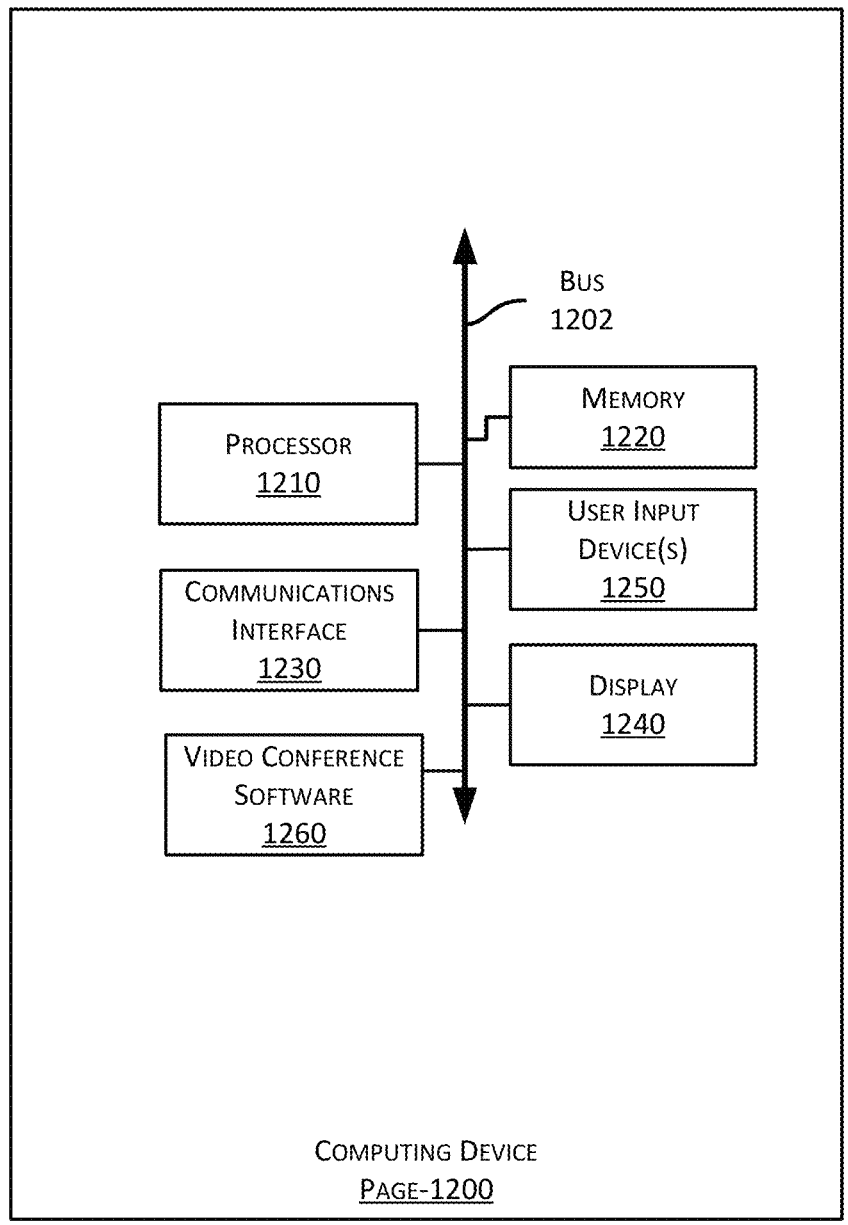
FIG. 12 illustrates an example computing device suitable for use in example systems or methods for providing a virtual exposition floor, a virtual expo booth and a booth space during a virtual exposition.

FIG. 12 illustrates an example computing device 1200 suitable for use in example systems or methods for providing a virtual exposition floor, a virtual expo booth and a booth space during a virtual exposition. The example computing device 1200 includes a processor 1210 which is in communication with the memory 1220 and other components of the computing device 1200 using one or more communications buses 1202. The processor 1210 is configured to execute processor-executable instructions stored in the memory 1220 to perform one or more methods for providing a virtual exposition floor, a virtual expo booth and a booth space during a virtual exposition, such as part or all of the example method 1100, described above with respect to FIG. 11. The computing device, in this example, also includes one or more user input devices 1250, such as a keyboard, mouse, touchscreen, video input device (e.g., one or more cameras), microphone, etc., to accept user input. The computing device 1200 also includes a display 1240 to provide visual output to a user.

The computing device 1200 also includes a communications interface 1230. In some examples, the communications interface 1230 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: establish a first video conference and a second video conference, the first video conference providing a virtual exposition floor and the second video conference associated with a virtual expo booth within the virtual exposition floor, and wherein a plurality of participants access at least the virtual exposition floor; provide, to one or more client devices, information to generate a graphical representation of the virtual exposition floor, a first graphical representation of the virtual expo booth, and a plurality of avatars associated with the plurality of participants; and provide, to at least one of the one or more client devices, in response to a user command from a first client device, at least one of: data associated with the first video conference, data associated with the second video conference, or data associated with the plurality of avatars associated with a respective participant.

Example 2 is the system of any previous or subsequent Example wherein the processor is further configured to execute processor-executable instructions stored in the non-transitory computer-readable medium to: receive a first request from a client device of the one or more client devices, to join the second video conference; and in response to the request, provide information to generate a second graphical representation of the virtual expo booth to the client device, wherein the second graphical representation of the virtual expo booth comprises a graphical representation of a third video conference associated with a booth space within the virtual expo booth; and in response to a second request, transmit information to one or more of the client devices to cause the respective client device to display a graphical representation of the booth space.

Example 3 is the system of any previous or subsequent Example, wherein each of the plurality of participants is associated with one of the plurality of avatars.

Example 4 is the system of any previous or subsequent Example, wherein the user command comprises an input sent from a client device associated with a participant of the plurality of participants that causes the client device to display an associated first avatar moving within a predetermined proximity of the graphical representation of the virtual expo booth.

Example 5 is the system of any previous or subsequent Example, wherein in response to the associated first avatar moving within the predetermined proximity of the graphical representation of the second video conference, the system provides information to generate a graphical representation of data associated with the virtual expo booth to be displayed on the client device.

Example 6 is the system of any previous or subsequent Example, wherein the second video conference is limited to a predetermined number of participants.

Example 7 is the system of any previous or subsequent Example, wherein the user command comprises an input sent from a client device associated with a participant of the plurality of participants that causes the client device to display an associated first avatar to move within a predetermined proximity a second avatar.

Example 8 is the system of any previous or subsequent Example, wherein processor is further configured to execute processor-executable instructions stored in the non-transitory computer-readable medium to: transmit, to the client device, in response to the associated first avatar moving within the predetermined proximity of the second avatar, information to generate a display of data associated with the second avatar on the client device, wherein the data associated with the second avatar comprises at least one of: a name associated with the second avatar, an occupation associated with the second avatar, or an image associated with the second avatar.

Example 9 is a method comprising: establishing, by a video conference provider, a first video conference and a second video conference, the first video conference providing a virtual exposition floor and the second video conference associated with a virtual expo booth within the virtual exposition floor, and wherein a plurality of participants access at least the virtual exposition floor; providing to one or more client devices, information to generate a graphical representation of the virtual exposition floor, a first graphical representation of the virtual expo booth, and a plurality of avatars associated with the plurality of participants; and providing to at least one of the one or more client devices, in response to a user command from a first client device, at least one of: data associated with the first video conference, data associated with the second video conference, and data associated with the plurality of avatars associated with a respective participant.

Example 10 is the method of any previous or subsequent Example further comprising: receiving a request from a client device of the one or more client devices, to join the virtual expo booth; and providing, in response to the request, information to generate a second graphical representation of the virtual expo booth to the client device, wherein the second graphical representation of the virtual expo booth comprises a graphical representation of a third video conference associated with a booth space within the expo booth.

Example 11 is the method of any previous or subsequent Example wherein the second graphical representation of the second graphical representation of the virtual expo booth further comprises a link which, in response to a request from the client device, causes one or more files associated with the booth space to be sent to the client device.

Example 12 is the method of any previous or subsequent Example, wherein the graphical representation of the first video conference comprises a first background characterized by one or more images.

Example 13 is the method of any previous or subsequent Example wherein the user command comprises an input sent from a client device associated with a participant of the plurality of participants, the method further comprising: transmitting, to the client device, information that causes the client device to display an associated first avatar moving within a predetermined proximity a second avatar.

Example 14 is the method of any previous or subsequent Example further comprising: transmitting, to the client device, in response to the associated first avatar moving within the predetermined proximity of the second avatar, information to generate a display of data associated with the second avatar on the client device, wherein the data associated with the second avatar comprises at least one of: a name associated with the second avatar, an occupation associated with the second avatar, or an image associated with the second avatar.

Example 15 is a non-transitory computer-readable medium comprising processor-executable instructions configured to cause one or more processors to: establish a first video conference and a second video conference, the first video conference providing a virtual exposition floor and the second video conference associated with a virtual expo booth within the virtual exposition floor, and wherein a plurality of participants access at least the virtual exposition floor; provide, to one or more client devices, information to generate a graphical representation of the virtual exposition floor, a first graphical representation of the virtual expo booth, and a plurality of avatars associated with the plurality of participants; and provide, to at least one of the one or more client devices, in response to a user command from a first client device, at least one of: data associated with the first video conference, data associated with the second video conference, and data associated with the plurality of avatars associated with a respective participant.

Example 16 is the non-transitory computer-readable medium of any previous or subsequent Example, wherein the data associated with the first video conference comprises a background.

Example 17 is the non-transitory computer-readable medium of any previous or subsequent Example, wherein the data associated with the second video conference comprises at least one of an image file or video file.

Example 18 is the non-transitory computer readable medium of any previous or subsequent Example, wherein the processors are further configured to: receive instructions comprising a revised layout of the graphical representation of the virtual exposition floor; and provide, to the client device, information to generate the revised layout of the graphical representation of the virtual exposition floor.

Example 19 is the non-transitory computer readable medium of any previous or subsequent Example, wherein the user command comprises an input sent from a client device associated with a participant of the plurality of participants that causes the client device to display an associated first avatar to move within a predetermined proximity a second avatar.

Example 20 is the non-transitory computer readable medium of any previous or subsequent Example, wherein the processors are further configured to: transmit, to the client device, in response to the associated first avatar moving within the predetermined proximity of the second avatar, information to generate a display of data associated with the second avatar on the client device, wherein the data associated with the second avatar comprises at least one of: a name associated with the second avatar, an occupation associated with the second avatar, or an image associated with the second avatar.

That which is claimed is:

1. A method comprising:
   receiving a virtual expo floor layout, the virtual expo floor layout establishing a virtual expo floor and locations for a plurality of virtual expo booths on the virtual expo floor;
   establishing, by a virtual conference provider, a virtual expo according to the virtual expo floor layout;
   establishing, by a video conference provider, a video conference corresponding to the virtual expo floor;
   in response to requests from a plurality of client devices to join the virtual expo:
      joining the plurality of client devices to the virtual expo, and
      providing, to each client device of the plurality of client devices, information indicating the virtual expo floor layout; and
   in response to a first request from a first client device to join a first virtual expo booth:
      joining the first client device to the first virtual expo booth, the first virtual expo booth comprising a plurality of booth spaces;

receiving a second request from the first client device to join a first booth space of the plurality of booth spaces, and joining the client device to a first booth space virtual conference corresponding to the first booth space.

2. The method of claim 1, further comprising:

receiving a third request from the first client device to join a second booth space of the plurality of booth spaces, responsive to determining a permission level associated with the first client device is not sufficient to join the second booth space, denying access to a second booth space virtual conference corresponding to the second booth space to the first client device.

3. The method of claim 1, wherein joining the first client device to the first virtual expo booth comprises joining the first client device to a virtual expo booth virtual conference.

4. The method of claim 1, wherein each of the plurality of booth spaces has a corresponding graphical representation within the first virtual expo booth.

5. The method of claim 1, wherein the first virtual expo booth comprises a resource table, the resource table comprising one or more links to files available for download.

6. The method of claim 1, further comprising, responsive to determining a permission level associated with the first client device is sufficient:

receiving an audio or video stream from the first client device; and distributing the audio or video stream to one or more other client devices joined to the first booth space virtual conference.

7. The method of claim 1, further comprising:

receiving, from the first client device, a command to mute one or more other client devices joined to the first booth space virtual conference; and responsive to determining a permission level associated with the first client device is sufficient, muting audio streams corresponding to the one or more other client devices.

8. The method of claim 1, further comprising:

receiving, from the first client device, a command to remove one or more other client devices from the first booth space virtual conference; and responsive to determining a permission level associated with the first client device is sufficient, removing the one or more other client devices from the first booth space virtual conference.

9. A system comprising:

a communications interface;

a non-transitory computer-readable medium; and one or more processors configured to execute processor-executable instructions stored in the non-transitory computer-readable medium to:

receive a virtual expo floor layout, the virtual expo floor layout establishing a virtual expo floor and locations for a plurality of virtual expo booths on the virtual expo floor;

establish, by a virtual conference provider, a virtual expo according to the virtual expo floor layout;

establish, by a video conference provider, a video conference corresponding to the virtual expo floor;

in response to requests from a plurality of client devices to join the virtual expo:

join the plurality of client devices to the virtual expo, and provide, to each client device of the plurality of client devices, information indicating the virtual expo floor layout; and in response to a first request from a first client device to join a first virtual expo booth:

join the first client device to the first virtual expo booth, the first virtual expo booth comprising a plurality of booth spaces;

receive a second request from the first client device to join a first booth space of the plurality of booth spaces, and join the client device to a first booth space virtual conference corresponding to the first booth space.

10. The system of claim 9, wherein the one or more processors are configured to execute further processor-executable instructions stored in the non-transitory computer-readable medium to:

receive a third request from the first client device to join a second booth space of the plurality of booth spaces, responsive to determining a permission level associated with the first client device is not sufficient to join the second booth space, deny access to a second booth space virtual conference corresponding to the second booth space to the first client device.

11. The system of claim 9, wherein the one or more processors are configured to execute further processor-executable instructions stored in the non-transitory computer-readable medium to join the first client device to a virtual expo booth virtual conference.

12. The system of claim 9, wherein each of the plurality of booth spaces has a corresponding graphical representation within the first virtual expo booth.

13. The system of claim 9, wherein the first virtual expo booth comprises a resource table, the resource table comprising one or more links to files available for download.

14. The system of claim 9, wherein the one or more processors are configured to execute further processor-executable instructions stored in the non-transitory computer-readable medium to, responsive to determining a permission level associated with the first client device is sufficient:

receive an audio or video stream from the first client device; and distribute the audio or video stream to one or more other client devices joined to the first booth space virtual conference.

15. The system of claim 9, wherein the one or more processors are configured to execute further processor-executable instructions stored in the non-transitory computer-readable medium to:

receive, from the first client device, a command to mute one or more other client devices joined to the first booth space virtual conference; and responsive to determining a permission level associated with the first client device is sufficient, mute audio streams corresponding to the one or more other client devices.

16. The system of claim 9, wherein the one or more processors are configured to execute further processor-executable instructions stored in the non-transitory computer-readable medium to:

receive, from the first client device, a command to remove one or more other client devices from the first booth space virtual conference; and responsive to determining a permission level associated with the first client device is sufficient, remove the one or more other client devices from the first booth space virtual conference.

17. A non-transitory computer-readable medium comprising processor-executable instructions configured to cause one or more processors to:
- receive a virtual expo floor layout, the virtual expo floor layout establishing a virtual expo floor and locations for a plurality of virtual expo booths on the virtual expo floor;
- establish, by a virtual conference provider, a virtual expo according to the virtual expo floor layout;
- establish, by a video conference provider, a video conference corresponding to the virtual expo floor;
- in response to requests from a plurality of client devices to join the virtual expo:
  - join the plurality of client devices to the virtual expo, and
  - provide, to each client device of the plurality of client devices, information indicating the virtual expo floor layout; and
- in response to a first request from a first client device to join a first virtual expo booth:
  - join the first client device to the first virtual expo booth, the first virtual expo booth comprising a plurality of booth spaces;
  - receive a second request from the first client device to join a first booth space of the plurality of booth spaces, and
  - join the client device to a first booth space virtual conference corresponding to the first booth space.

18. The non-transitory computer-readable medium of claim 17, further comprising processor-executable instructions configured to cause the one or more processors too:
- receive a third request from the first client device to join a second booth space of the plurality of booth spaces,
- responsive to determining a permission level associated with the first client device is not sufficient to join the second booth space, deny access to a second booth space virtual conference corresponding to the second booth space to the first client device.

19. The non-transitory computer-readable medium of claim 17, further comprising processor-executable instructions configured to cause the one or more processors to:
- receive, from the first client device, a command to mute one or more other client devices joined to the first booth space virtual conference; and
- responsive to determining a permission level associated with the first client device is sufficient, mute audio streams corresponding to the one or more other client devices.

20. The non-transitory computer-readable medium of claim 17, further comprising processor-executable instructions configured to cause the one or more processors to:
- receive, from the first client device, a command to remove one or more other client devices from the first booth space virtual conference; and
- responsive to determining a permission level associated with the first client device is sufficient, remove the one or more other client devices from the first booth space virtual conference.

* * * * *